(12) United States Patent
Ancimer et al.

(10) Patent No.: US 9,162,183 B2
(45) Date of Patent: Oct. 20, 2015

(54) SYSTEM AND METHOD TO MANAGE SCR CATALYST $NO_2/NO_X$ RATIO

(71) Applicant: Cummins Inc., Columbus, IN (US)

(72) Inventors: Richard Ancimer, Columbus, IN (US); Mert Geveci, Albany, NY (US)

(73) Assignee: CUMMINS INC., Columbus, IN (US)

( * ) Notice: Subject to any disclaimer, the term of this patent is extended or adjusted under 35 U.S.C. 154(b) by 22 days.

(21) Appl. No.: 13/771,703

(22) Filed: Feb. 20, 2013

(65) Prior Publication Data

US 2013/0232958 A1  Sep. 12, 2013

Related U.S. Application Data

(60) Provisional application No. 61/607,143, filed on Mar. 6, 2012.

(51) Int. Cl.

| *F01N 3/20* | (2006.01) |
|---|---|
| *B01D 53/94* | (2006.01) |
| *F01N 3/10* | (2006.01) |
| *F01N 11/00* | (2006.01) |

(Continued)

(52) U.S. Cl.
CPC ........ *B01D 53/9495* (2013.01); *B01D 53/9418* (2013.01); *F01N 3/035* (2013.01); *F01N 3/10* (2013.01); *F01N 3/208* (2013.01); *F01N 11/00* (2013.01); *F01N 13/009* (2014.06); *F01N 13/0093* (2014.06); *B01D 2255/904* (2013.01); *F01N 3/106* (2013.01); *F01N 2550/02* (2013.01); *F01N 2560/021* (2013.01); *F01N 2560/026* (2013.01); *F01N 2560/06* (2013.01); *F01N 2610/02* (2013.01); *F01N 2900/0412* (2013.01);

(Continued)

(58) Field of Classification Search
CPC ........ F01N 3/035; F01N 3/208; F01N 11/00; F01N 13/0093; F01N 2550/02; F01N 2560/026; F01N 2610/02; F01N 2900/0412; F01N 2900/0418; F01N 2900/1402; F01N 2900/1602; F01N 2900/1612; F01N 2900/1621
USPC ........... 60/274, 276, 277, 286, 295, 297, 299, 60/301, 311
See application file for complete search history.

(56) References Cited

U.S. PATENT DOCUMENTS

| 6,125,629 A | 10/2000 | Patchett |
|---|---|---|
| 6,182,444 B1 | 2/2001 | Fulton et al. |

(Continued)

FOREIGN PATENT DOCUMENTS

| EP | 2 230 001 A1 | 9/2010 |
|---|---|---|
| EP | 1 458 960 B1 | 2/2011 |

*Primary Examiner* — Thomas Denion
*Assistant Examiner* — Jorge Leon, Jr.
(74) *Attorney, Agent, or Firm* — Taft, Stettinus & Hollister LLP

(57) ABSTRACT

Systems and methods are provided for determining and controlling an $NO_2$ to $NO_x$ ratio reference target in an exhaust conduit between a first SCR catalyst and a second SCR catalyst. The method includes determining a present $NO_2$ to $NO_x$ ratio in the exhaust conduit between the first SCR catalyst and the second SCR catalyst, and providing a reductant doser command in response to a deviation of the present $NO_2$ to $NO_x$ ratio from the $NO_2$ to $NO_x$ ratio reference target.

34 Claims, 3 Drawing Sheets

(51) Int. Cl.
   *F01N 3/035*   (2006.01)
   *F01N 13/00*   (2010.01)

(52) U.S. Cl.
   CPC . *F01N 2900/0418* (2013.01); *F01N 2900/1402* (2013.01); *F01N 2900/1404* (2013.01); *F01N 2900/1602* (2013.01); *F01N 2900/1612* (2013.01); *F01N 2900/1621* (2013.01); *Y02T 10/24* (2013.01)

(56) References Cited

U.S. PATENT DOCUMENTS

| | | | |
|---|---|---|---|
| 6,996,975 B2 | 2/2006 | Radhamohan et al. | |
| 7,134,273 B2 | 11/2006 | Mazur et al. | |
| 7,264,785 B2 | 9/2007 | Blakeman et al. | |
| 7,485,272 B2 | 2/2009 | Driscoll et al. | |
| 7,805,929 B2 | 10/2010 | Driscoll | |
| 8,263,031 B2 * | 9/2012 | Gotan et al. | 423/213.2 |
| 2005/0284134 A1 | 12/2005 | Radhamohan et al. | |
| 2009/0031702 A1 * | 2/2009 | Robel | 60/274 |
| 2009/0272099 A1 * | 11/2009 | Garimella et al. | 60/277 |
| 2009/0288402 A1 * | 11/2009 | Voss et al. | 60/299 |
| 2010/0126151 A1 * | 5/2010 | Andersson et al. | 60/297 |
| 2010/0199634 A1 * | 8/2010 | Heaton | 60/274 |
| 2011/0146233 A1 * | 6/2011 | Carlill et al. | 60/274 |
| 2012/0006002 A1 * | 1/2012 | Hagimoto et al. | 60/274 |

\* cited by examiner

SYSTEM AND METHOD TO MANAGE SCR CATALYST $NO_2/NO_x$ RATIO

CROSS-REFERENCE TO RELATED APPLICATION

The present application claims the benefit of the filing date of Provisional App. Ser. No. 61/607,143 filed on Mar. 6, 2012, which is incorporated herein by reference.

BACKGROUND

Control of selective catalytic reduction (SCR) catalysts is of increasing interest to meet modern internal combustion engine emissions standards. The efficiency of a typical SCR catalyst in removing $NO_x$ emissions is sensitive to the molar ratio of $NO_2$ to $NO_x$ at the inlet to the SCR catalyst. Under most conditions, the ratio of $NO_2$ to $NO_x$ at the SCR inlet is established by the operational capability of the upstream diesel oxidation catalyst (DOC) and diesel particulate filter (DPF) since these components tend to make $NO_2$ from NO upstream of the SCR catalyst inlet. However, as these components age, this ability to convert NO to $NO_2$ deteriorates, and the molar ratio of $NO_2$ to $NO_x$ at the inlet to the SCR catalyst drops. Thus, the efficiency of the SCR catalyst is reduced over time. Accordingly, further technological developments in this area are desirable.

SUMMARY

One embodiment is a unique method and/or system for managing an $NO_2$ to $NO_x$ ratio at the inlet of an SCR catalyst in an aftertreatment system. Further embodiments, forms, objects, features, advantages, aspects, and benefits shall become apparent from the following description and drawings.

DESCRIPTION OF THE ILLUSTRATIVE EMBODIMENTS

Figure 1:
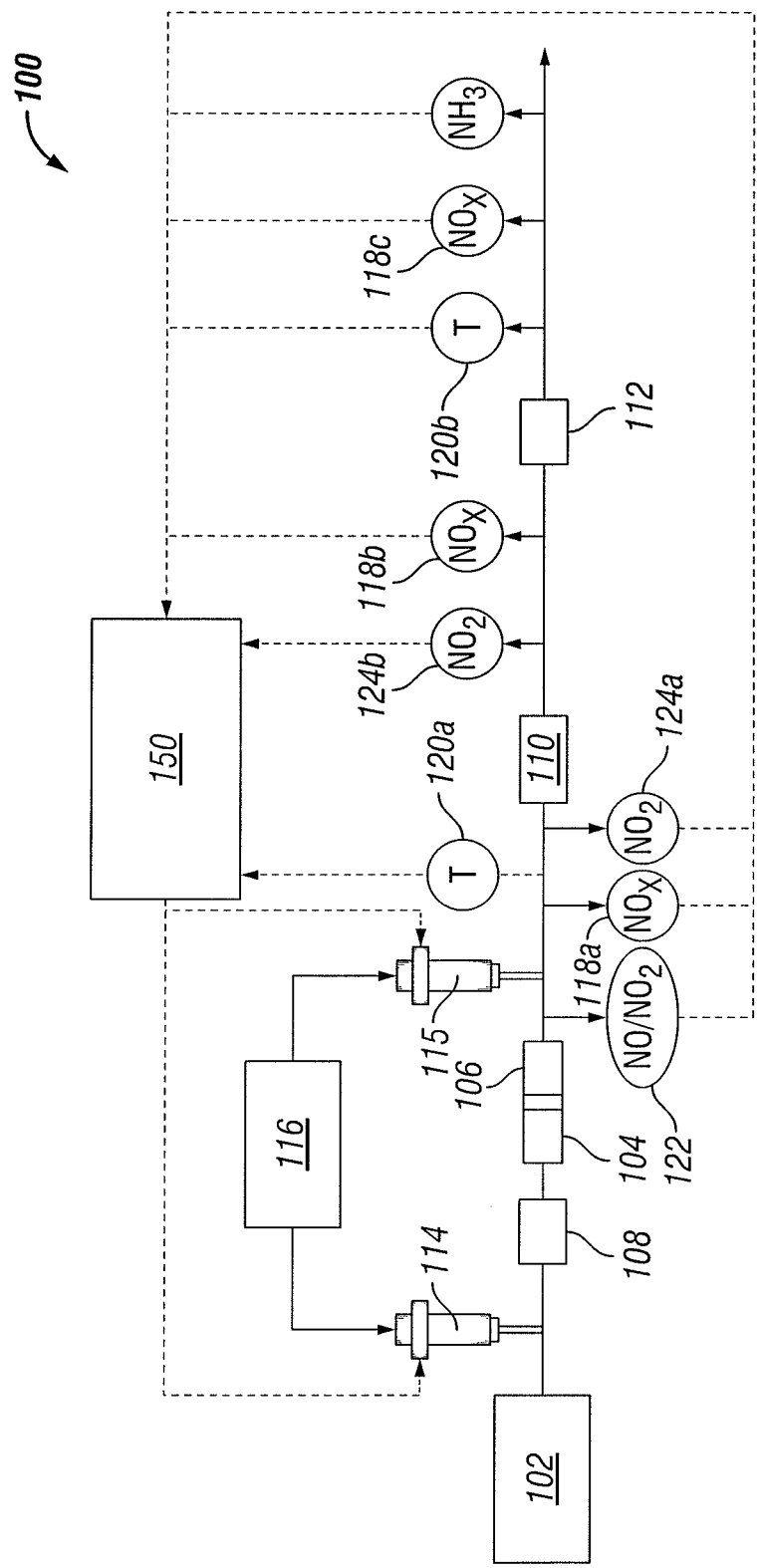
FIG. 1 is an exemplary system for control of an SCR aftertreatment system that is operable to manage an $NO_2$ to $NO_x$ ratio target at the SCR inlet.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is an exemplary engine and SCR aftertreatment system 100 with a controller 150. The system 100 includes an internal combustion engine 102 and an exhaust conduit fluidly coupled to the internal combustion engine. The system 100 includes a close-coupled selective catalytic reduction (SCR) catalyst 108 fluidly coupled to the exhaust conduit near engine 102, and a main SCR catalyst 110 fluidly coupled to the exhaust conduit at a position downstream of the close-coupled SCR catalyst 108. The system 100 includes an $NO/NO_2$ sensor 122 coupled to the exhaust conduit at a position between the close-coupled SCR catalyst 108 and the main SCR catalyst 110, a first reductant doser 114 operationally coupled to the exhaust conduit at a position upstream of the close-coupled SCR catalyst 108, and a second reductant doser 115 operationally coupled to the exhaust conduit at a position upstream of the main SCR catalyst 110.

The system 100 further includes controller 150 having a number of modules structured to functionally execute operations for controlling the SCR system. In certain embodiments, the controller forms a portion of a processing subsystem including one or more computing devices having memory, processing, and communication hardware. The controller may be a single device or a distributed device, and the functions of the controller may be performed by hardware or software. The controller may be in communication with any sensor, actuator, datalink, and/or network in the system.

In certain embodiments, the controller includes an $NO_2$ to $NO_x$ ratio reference target module, an $NO_2$ to $NO_x$ ratio determination module, an $NO_2$ to $NO_x$ ratio deviation module, and a dosing control module. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

In certain further embodiments, the system 100 includes a diesel oxidation catalyst (DOC) 104 and a diesel particulate filter (DPF) 106 forming a DOC/DPF system positioned between close-coupled catalyst 108 and main SCR catalyst 110. In other embodiments, any of the components 104, 106 may be present or missing, catalyzed or not catalyzed, and may be arranged in alternate order. Further, certain components or all components may be provided in the same or separate housings.

The first reductant doser 114 is fluidly coupled to a reductant source such as a reductant storage tank 116. First reductant doser 114 is fluidly coupled to the exhaust conduit at a position upstream of close-coupled catalyst 108. The second reductant doser 115 is fluidly coupled to a reductant source such as the reductant storage tank 116. Second reductant doser 115 is fluidly coupled to the exhaust conduit at a position upstream of main SCR catalyst 110. The reductant is any type of reductant utilized in an SCR aftertreatment system. Specific examples include those that results in ammonia being utilized as the final reductant—including at least ammonia (gaseous or aqueous), urea, and aqueous solutions of urea.

The system 100 may include an ammonia oxidation catalyst (AMOX) 112 downstream of the second SCR catalyst 110. In certain embodiments, the AMOX 112 may not be present, or the AMOX 112 may be commingled with the main SCR catalyst 110 (or the last SCR catalyst, where multiple SCR catalysts are present), for example with a washcoat applied toward the rear portion of the main SCR catalyst 110 that is devised to at least partially oxidize ammonia.

The exemplary system 100 further includes various sensors. The illustrated sensors include a first $NO_x$ sensor 118a positioned upstream of the main SCR catalyst 110, a second $NO_x$ sensor 118b positioned downstream of the main SCR catalyst 110, a first temperature sensor 120a positioned between the SCR catalysts 108, 110, and a second temperature sensor 120b and third $NO_x$ sensor 118c and $NH_3$ sensor can be positioned downstream of the AMOX catalyst 112. In addition, $NO/NO_2$ sensor 122 is positioned at the outlet of the DOC/DPF system, and $NO_2$ sensors 124a, 124b are positioned at the inlet and the outlet of main SCR catalyst 110.

In addition, sensors can be provided that measure or detect deactivation conditions of one or more components of the aftertreatment system, such as the cumulative hours of DPF regeneration, accumulated temperature time data, miles, hours of operation, reversible and irreversible poisoning, and fueling at temperature. In one example, a sensor is provided to measure sulfur loading on one or both of the SCR catalysts 108, 110 to determine a sulfur loading condition or sulfur poisoning of one or both of the SCR catalyst and/or the DOC/DPF system. Other sensors can be provided to measure or determine the mass flow through the exhaust system, the temperature of any component of the aftertreatment system, the amount of ammonia stored in one or both of the SCR catalysts 108, 110 or outlet therefrom, etc.

The illustrated sensors are exemplary only, and may be re-positioned, removed, substituted, and other sensors may be present that are not illustrated in FIG. 1. Further, certain sensors may instead be virtual sensors that are calculated from other parameters available to the system, or values that would be indicated by sensors may instead be supplied to a computer readable memory location, via a datalink or network communication, or otherwise be made available to the system where the sensor providing the sensed parameter is not a part of the defined system.

Figure 2:
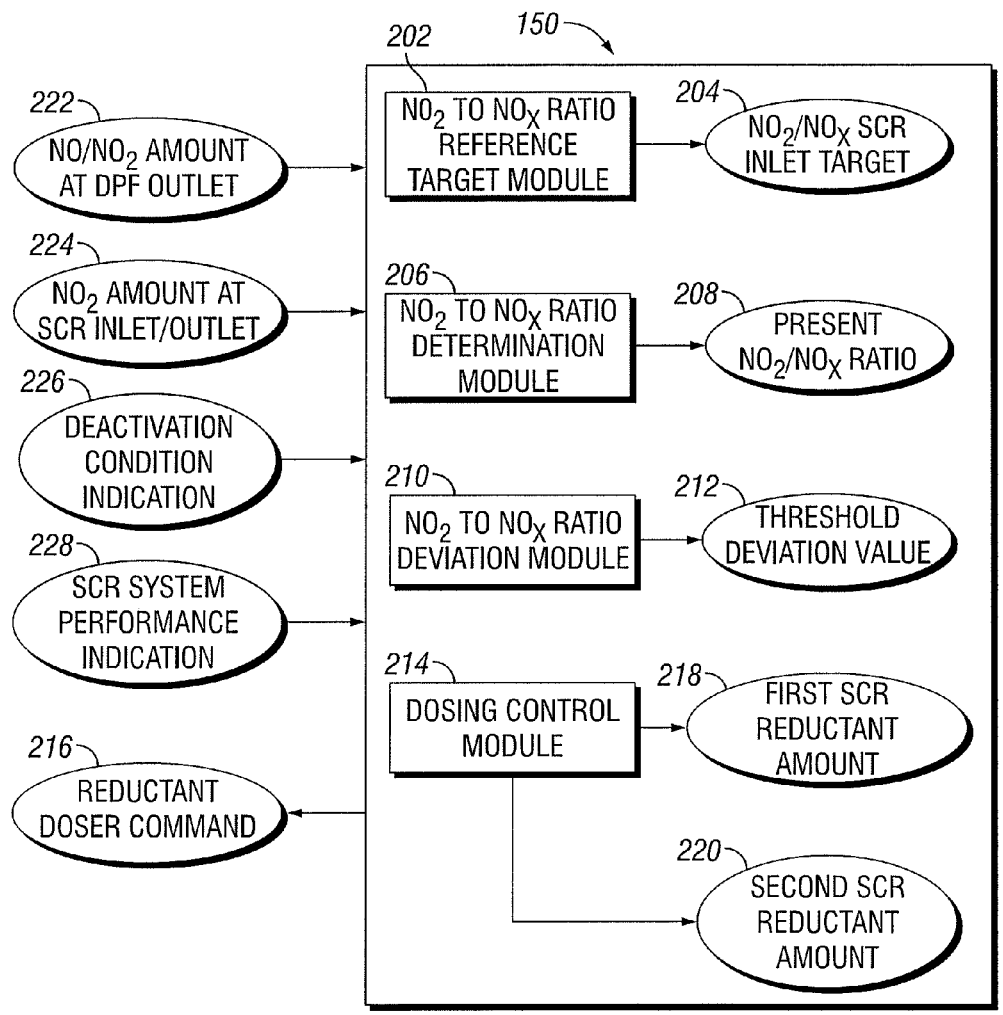
FIG. 2 is an exemplary controller for executing operations to manage an $NO_2$ to $NO_x$ ratio target at the SCR inlet.

FIG. 2 is an exemplary controller 150 for executing operations to manage a target ratio of $NO_2$ to $NO_x$ at the inlet to main SCR catalyst 110 and provide a reductant doser command. The controller operations of the controller in FIG. 2 are operations that adjust nominal control operations for a $NO_x$ aftertreatment system utilizing a reductant. Nominal control operations for a $NO_x$ aftertreatment system, including an SCR aftertreatment system, are understood in the art and are not described further herein. Any nominal $NO_x$ aftertreatment control operations may be utilized, including without limitation control operations described in U.S. patent application Ser. No. 13/051,693 "Ammonia sensor control of an SCR aftertreatment sensor," filed Mar. 18, 2011 which is incorporated herein by reference in its entirety.

The controller 150 includes an $NO_2$ to $NO_x$ ratio reference target module 202 that determines an $NO_2$ to $NO_x$ ratio target 204 at the inlet to main SCR catalyst 110. The $NO_2$ to $NO_x$ ratio target 204 is a target amount of $NO_2$ in an exhaust conduit downstream of the DOC-DPF system 104, 106 that maintains $NO_x$ reduction efficiency of the aftertreatment system over time. The $NO_2$ to $NO_x$ ratio target 204 is a nominal control value for the controller 150, and/or is determined in response to the nominal control value. For example, the $NO_2$ to $NO_x$ ratio target 204 may be the $NO_2$ value at the inlet to main SCR catalyst 110 that occurs in response to a targeted amount of reductant injected upstream of the close-coupled catalyst 108 as determined from an amount of $NO_x$ being emitted by the engine and the NO to $NO_2$ conversion capability of the DOC/DPF system. In one embodiment, the $NO_2$ to $NO_x$ ratio target 204 is 0.5. However, $NO_2$ to $NO_x$ ratio target 204 may further be defined by a range of $NO_2$ to $NO_x$ ratios that that are less than and/or more than 0.5 that otherwise provide the desired $NO_x$ reduction from main SCR catalyst 110.

A kinetically favored SCR reaction requires the presence of NO and $NO_2$ in equimolar ratio. Certain aftertreatment components, such as the DOC/DPF system, make $NO_2$ from NO and $O_2$. However, this oxidation reaction deactivates over time as these aftertreatment components age or encounter other deactivation conditions such as sulfur loading. As the inlet $NO_x$ concentration to the DOC increases, the DOC/DPF system has reduced relative capability to convert NO to $NO_2$, which decreases the $NO_2$ to $NO_x$ ratio at the outlet of the DOC/DPF system and at the inlet to the SCR catalyst, adversely impacting the ability of the SCR catalyst to remove $NO_x$ from exhaust emissions. Therefore, the system disclosed herein is capable of producing additional $NO_2$ at the outlet of the DOC/DPF system to manage the $NO_2$ amount that provides $NO_2$ to $NO_x$ ratio target 204, extending the useful life of the aftertreatment system. In the illustrated embodiment, this is accomplished with close-coupled SCR catalyst 108 upstream of the DOC/DPF system and a reductant doser 114 upstream of close-coupled SCR catalyst 108. By increasing the reductant dosing over close-coupled SCR catalyst 108, the inlet $NO_x$ concentration of the DOC/DPF system is reduced. The DOC/DPF system outlet $NO_2/NO_x$ ratio would thereby increase because the self-poisoning of the DOC/DPF system is reduced. The reductant amount injected by reductant closer 114 is controlled to provide the $NO_2$ amount at the outlet of the DOC/DPF system that satisfies the $NO_2$ to $NO_x$ ratio target 204 at the inlet to main SCR catalyst 110. However, the amount of reductant provided upstream of close-coupled SCR catalyst 108 is controlled to limit or prevent ammonia slip into the DOC which can create undesirable products of $NO_x$ or $N_2O$.

The controller 150 further includes an $NO_2$ to $NO_x$ ratio determination module 206 that determines a present amount of $NO_2$ in the exhaust conduit at the inlet to main SCR catalyst 110. The present amount of $NO_2$ can be used to determine a present $NO_2$ to $NO_x$ ratio 208. Controller 150 also includes an $NO_2$ to $NO_x$ ratio deviation module 210 that determines a threshold deviation value 212 in response to the $NO_2$ to $NO_x$ ratio target 204 and the present $NO_2$ to $NO_x$ ratio 208. The controller 150 further includes a dosing control module 214 that provides a reductant doser command 216 to first reductant doser 114 and second reductant doser 115 in response to threshold deviation value 212. The reductant doser command 216 provided by the dosing control module 214 may include a first SCR reductant amount 218 to close-coupled SCR catalyst 108 and a second SCR reductant amount 220 to main SCR catalyst 110. In one embodiment, as the first SCR reductant amount 218 increases, the second SCR reductant amount 220 to main SCR catalyst 110 decreases. However, there is a constraint on first SCR reductant amount 218 in that $NH_3$ slip past close-coupled SCR catalyst 108 is undesirable since the $NH_3$ slipping past will likely be oxidized over the DOC/DPF to undesirable products of NO, $NO_2$ and $N_2O$. Thus, first SCR reductant amount 218 can be limited to prevent ammonia slip past close-coupled SCR catalyst 108 in accordance with operating parameters, primarily the temperature and flow rate of the exhaust gas.

The dosing control module 214 provides the reductant doser command 216 in response to the threshold deviation value 212 indicating that the present $NO_2$ to $NO_x$ ratio 208 deviates more than a threshold amount from $NO_2$ to $NO_x$ ratio target 204. The reductant doser command 216 may be provided under any control scheme understood in the art, and/or under specific control schemes described herein. The reductant doser command 216 may include an actuator command value, a voltage or other electrical signal, and/or a datalink or network command. In certain embodiments, a reductant closer in a system including the controller 150 is responsive to the reductant doser command 216 to provide reductant to an exhaust stream at the positions of reductant dosers 114, 115 upstream of the respective SCR catalysts 108, 110.

In one embodiment, $NO_2$ to $NO_x$ ratio determination module 206 determines the present $NO_2$ to $NO_x$ ratio 208 by receiving an input 222 of the $NO/NO_2$ amount at the DPF outlet from $NO/NO_2$ sensor 122. As discussed above, an equimolar ratio of NO to $NO_2$ is favored for the SCR catalyst reaction. Therefore, when $NO_2$ to $NO_x$ ratio deviation module determines the molar ratio of NO to $NO_2$ exceeds 1 by more than a threshold deviation value 212, the DOC/DPF system is not converting sufficient NO to $NO_2$ to manage the $NO_2$ to $NO_x$ ratio at the inlet to main SCR catalyst 110. Dosing control module 214 provides a reductant closer command 216 that increases the amount of reductant dosing to close-coupled SCR catalyst 108 and generates additional $NO_2$ at the inlet to main SCR catalyst 110. As used herein, an increase in the amount of reductant can include increasing the rate at which reductant is injected and/or increasing the range of engine operating conditions in which dose-coupled SCR catalyst is utilized for treatment of $NO_x$ emissions, including those conditions which otherwise would be treated by solely utilizing main SCR catalyst 110. Furthermore, the portion of reductant closer command. 216 corresponding to first SCR reductant amount 218 can be limited to prevent ammonia slip past dose-coupled SCR catalyst 108 as discussed above.

In another embodiment, $NO_2$ to $NO_x$ ratio determination module 206 determines the present $NO_2$ to $NO_x$ ratio 208 by receiving an input 224 of the $NO_2$ and $NO_x$ amounts at the inlet and outlet of main SCR catalyst 110 with $NO_2$ sensors 124a, 124b and $NO_x$ sensors 118a, 118b. When $NO_2$ to $NO_x$ ratio deviation module 210 determines that $NO_2$ levels indicate the present $NO_2$ to $NO_x$ ratio 208 deviates from the $NO_2$ to $NO_x$ ratio reference target 204 by more than a threshold deviation value 212, dosing control module 214 provides a reductant doser command 216 that increases the amount of reductant dosing to close-coupled SCR catalyst 108 to generate additional $NO_2$ at the inlet to main SCR catalyst 110.

In yet another embodiment, $NO_2$ to $NO_x$ ratio determination module 206 determines the present $NO_2$ to $NO_x$ ratio 208 by receiving an input 226 of a deactivation condition of one or more components of the aftertreatment system which provide an indication of reduced $NO_2$ production capability. For example, a poisoning condition or an aging condition, such as the cumulative DPF regeneration hours, accumulated temperature hours, hours of operation, miles, or fueling at temperature, can be tracked and correlated to the reduction in the capability of the aftertreatment system to produce $NO_2$ at the inlet to main SCR catalyst 110 without utilization of reductant doser 114 and close-coupled catalyst 108. $NO_2$ to $NO_x$ ratio deviation module 210 can be programmed with a calibration table or the like that indicates the threshold deviation value 212 that occurs when a deactivation condition is met. Dosing control module 214 provides a reductant doser command 216 linked to the deactivation condition to increase the amount of reductant dosing to close-coupled SCR catalyst 108 and generate additional $NO_2$ at the inlet to main SCR catalyst 110.

In yet another embodiment, $NO_2$ to $NO_x$ ratio determination module 206 determines the present $NO_2$ to $NO_x$ ratio 208 by receiving an input 228 of an SCR system performance indication. For example, if for the same flow and temperature condition the main SCR catalyst stores more ammonia, then it is assumed that the $NO_2$ amount at the inlet to main SCR catalyst 110 is low. $NO_2$ to $NO_x$ ratio deviation module 210 can be programmed to determine that a threshold deviation value 212 occurs when an SCR performance indicator, such as high ammonia storage in the SCR catalyst, is met. Dosing control module 214 provides a reductant doser command 216 linked to the performance indication to increase the amount of reductant dosing to close-coupled SCR catalyst 108 and generate additional $NO_2$ at the inlet to main SCR catalyst 110.

The descriptions here provide illustrative embodiments of performing procedures for controlling an SCR aftertreatment system. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

Figure 3:
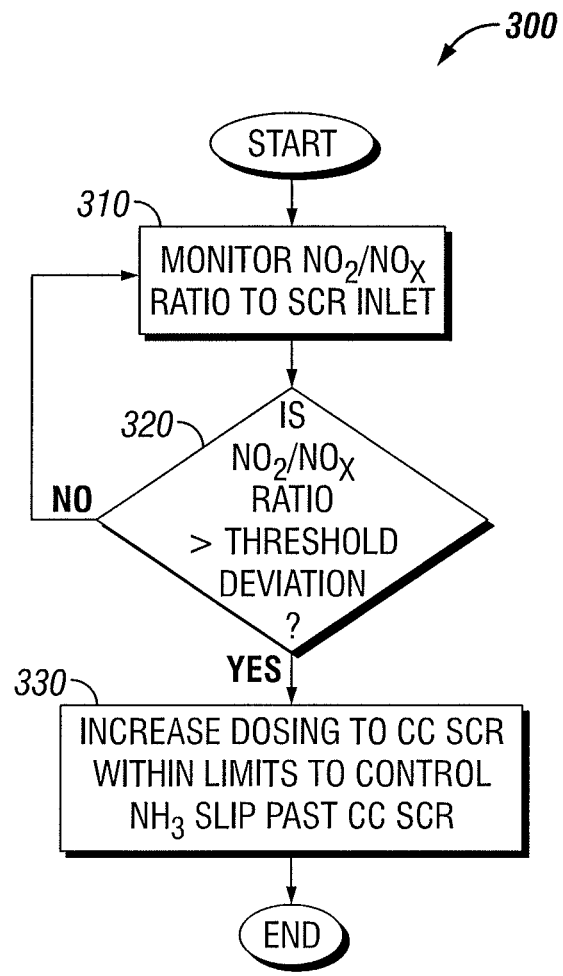
FIG. 3 is a flow diagram of a procedure for managing an $NO_2$ to $NO_x$ ratio target at the SCR inlet.

With reference to FIG. 3, an exemplary procedure 300 includes an operation 310 to monitor the $NO_2$ to $NO_x$ ratio at the inlet to main SCR catalyst 110. The procedure 300 further includes a conditional 320 that determines if the $NO_2$ to $NO_x$ ratio at the SCR inlet is greater than a predetermined threshold deviation from a target $NO_2$ to $NO_x$ ratio at the SCR inlet. If the response to conditional 320 is NO because it is determined that $NO_2$ to $NO_x$ ratio at the SCR inlet is not greater than the threshold deviation, then procedure 300 returns to operation 310. Alternatively, procedure 300 can end until started again after lapse of a predetermined amount of time and/or occurrence of one or more operating conditions.

If the response to conditional 320 is a YES, then procedure 300 continues at operation 330. At operation 330 a signal is provided to controller 150 to provide a reductant doser command that increases the reductant dosing to the close-coupled SCR catalyst, which creates additional $NO_2$ at the DOC/DPF system outlet and therefore increases the $NO_2$ to $NO_x$ ratio at the SCR inlet to a value that approaches the target $NO_2$ to $NO_x$ ratio and is less than the threshold deviation value. Furthermore, the reductant amount provided to the close-coupled SCR catalyst is limited to prevent ammonia slip in accordance with current operating conditions, such as exhaust temperature and flow rate. After execution of operation 330, procedure 300 ends until started again after lapse of a predetermined amount of time and/or occurrence of one or more operating conditions.

As is evident from the figures and text presented above, a variety of embodiments according to the present invention are contemplated.

An exemplary set of embodiments is a method including determining an $NO_2$ to $NO_x$ ratio reference target at an inlet to a first SCR catalyst and determining a present $NO_2$ to $NO_x$ ratio to the first SCR catalyst. The method also includes determining an $NO_2$ to $NO_x$ ratio deviation in response to the $NO_2$ to $NO_x$ ratio reference target and the present $NO_2$ to $NO_x$ ratio, and further determining a reductant doser command for injection of a reductant amount upstream of a second SCR catalyst. The second SCR catalyst is located upstream of both the first SCR catalyst and a DOC/DPF system. The reductant doser command is provided in response to the $NO_2$ to $NO_x$ ratio deviation.

In certain embodiments, the method includes determining a rate of change of the present $NO_2$ to $NO_x$ ratio and further adjusting the reductant doser command in response to the rate of change. In another embodiment of the method, determining the present $NO_2$ to $NO_x$ ratio further comprises determining an $NO/NO_2$ amount at an outlet of the DOC/DPF system. In another embodiment of the method, determining the present $NO_2$ to $NO_x$ ratio further comprises determining the $NO_2$ amount at the inlet and the outlet of the first SCR catalyst.

In yet other embodiments of the method, determining the present $NO_2$ to $NO_x$ ratio further comprises determining a deactivation condition of an aftertreatment system, in which the aftertreatment system includes the first and second SCR catalysts and the DOC/DPF system. In one refinement of this embodiment, determining the deactivation condition includes determining cumulative regeneration hours of the DOC/DPF system. In another refinement of this embodiment, determining the deactivation condition includes determining accumulated temperature time of the aftertreatment system. In another refinement of this embodiment, determining the deactivation condition includes determining a reversible deactivation condition through accumulated fuel consumption at temperature. In one example, the reversible deactivation condition is a sulfur poisoning of the one or both the SCR catalysts and/or the DOC/DPF system.

In further embodiments of the method, the reductant amount for injection upstream of the second SCR catalyst increases as the DOC/DPF system ages. In one refinement of this embodiment, the reductant amount for injection upstream of the second SCR catalyst is limited to prevent ammonia slip past the second SCR catalyst. In another embodiment of the method, determining the reductant injection command further includes determining a second reductant command for injection of a second reductant amount upstream of the first SCR catalyst and downstream of the DOC/DPF system. In one refinement of this embodiment, the second reductant amount decreases as the first reductant amount increases. In an exemplary embodiment, the second SCR catalyst is a close-coupled SCR catalyst upstream of the DOC/DPF system.

Another set of exemplary embodiments is a method including interpreting an $NO_2$ to $NO_x$ ratio reference target comprising a target amount of $NO_2$ at an inlet to a first SCR catalyst, interpreting a present $NO_2$ to $NO_x$ ratio upstream of the first SCR catalyst, interpreting a deviation of the present $NO_2$ to $NO_x$ ratio from the $NO_2$ to $NO_x$ ratio reference target, and injecting an amount of urea, typically as an aqueous urea solution, upstream of a second SCR catalyst to provide the target amount of $NO_2$ at the inlet of the first SCR catalyst in response to the deviation of the present $NO_2$ to $NO_x$ ratio exceeding a threshold deviation. The second SCR catalyst is located upstream of the first SCR catalyst.

In yet other embodiments, a DOC/DPF system is provided between the first and second SCR catalysts. In an exemplary embodiment, the method includes injecting a second amount of urea upstream of the first SCR and downstream from the DOC/DPF system. In a refinement of this embodiment, the second amount of urea decreases as the first amount of urea increases. In another exemplary embodiment, interpreting the present $NO_2$ to $NO_x$ ratio further comprises interpreting an $NO/NO_2$ amount at an outlet of the DOC/DPF system. In a further exemplary embodiment, interpreting the present $NO_2$ to $NO_x$ ratio further comprises interpreting an $NO_2$ amount at the inlet and an outlet of the first SCR catalyst. In another exemplary embodiment, interpreting the present $NO_2$ to $NO_x$ ratio further comprises interpreting a deactivation condition of an aftertreatment system, wherein the aftertreatment system includes the first and second SCR catalysts and a DOC/DPF system. In one refinement of this embodiment, interpreting the deactivation condition includes interpreting cumulative regeneration hours of the DOC/DPF system.

In other exemplary embodiments, the $NO_2$ to $NO_x$ ratio reference target is a molar ratio of $NO_2$ to $NO_x$. In one embodiment, this molar ratio is 0.5.

Another exemplary set of embodiments is an apparatus including an $NO_2$ to $NO_x$ ratio reference target module structured to determine a $NO_2$ to $NO_x$ ratio reference target at an inlet to a first SCR catalyst, an $NO_2$ to $NO_x$ ratio determination module structured to determine a present $NO_2$ to $NO_x$ ratio at the inlet to the first SCR catalyst, and an $NO_2$ to $NO_x$ ratio deviation module structured to determine an $NO_2$ threshold deviation value in response to the $NO_2$ to $NO_x$ ratio reference target and the present $NO_2$ to $NO_x$ ratio. The apparatus further includes a dosing control module structured to provide a reductant doser command in response to the $NO_2$ threshold deviation value. The reductant doser command corresponds to a reductant amount for injection upstream of a second SCR catalyst, where the second SCR catalyst is located upstream of the first SCR catalyst.

In certain embodiments, the apparatus includes a DOC/DPF system between the first SCR catalyst and the second SCR catalyst. In further embodiments, the dosing control module is further structured provide a second reductant doser command in response to the $NO_2$ threshold deviation value, the second reductant doser command corresponding to a second reductant amount for injection upstream of the first SCR catalyst and downstream of the DOC/DPF system. In another embodiment, the second SCR catalyst is a close-coupled SCR catalyst. In yet another embodiment, the $NO_2$ to $NO_x$ ratio determination module is further structured to determine the present $NO_2$ to $NO_x$ ratio as a function of an $NO/NO_2$ amount at an outlet of the DOC/DPF system. In a further embodiment, the $NO_2$ to $NO_x$ ratio determination module is further structured to determine the present $NO_2$ to $NO_x$ ratio as a function of a deactivation condition an aftertreatment system.

In another exemplary embodiment of the apparatus, the $NO_2$ to $NO_x$ ratio determination module is further structured to determine the present $NO_2$ to $NO_x$ ratio as a function of the $NO_2$ amount at the inlet and an outlet of the first SCR catalyst.

Another exemplary set of embodiments is a system including an internal combustion engine, an exhaust conduit fluidly coupled to the internal combustion engine, a first selective catalytic reduction (SCR) catalyst fluidly coupled to the exhaust conduit, a second SCR catalyst fluidly coupled to the exhaust conduit at a position upstream of the first SCR catalyst, and a reductant doser operationally coupled to the exhaust conduit at a first position upstream of the first SCR catalyst and downstream of the second SCR catalyst and at a second position upstream of the second SCR catalyst.

The system further includes a controller comprising an $NO_2$ to $NO_x$ ratio reference target module structured to determine a $NO_2$ to $NO_x$ ratio reference target at an inlet to the first SCR catalyst. The controller further includes an $NO_2$ to $NO_x$ ratio determination module structured to determine a present $NO_2$ to $NO_x$ ratio at the inlet to the first SCR catalyst. The controller also includes an $NO_2$ to $NO_x$ ratio deviation module structured to determine an $NO_2$ threshold deviation value in response to the $NO_2$ to $NO_x$ ratio reference target and the present $NO_2$ to $NO_x$ ratio. The controller further includes a dosing control module structured to provide a reductant doser command in response to the $NO_2$ threshold deviation value. The reductant doser command corresponds to a first reductant amount for injection at the first position and a second reductant amount for injection at the second position.

In an exemplary embodiment, the second SCR catalyst is a close-coupled SCR catalyst and the reductant is an aqueous urea solution.

Another exemplary set of embodiments is a method that includes determining a present nitrous oxide removal (deNO$_x$) capability of a first SCR catalyst. The method also includes determining a reductant doser command for injection of a reductant amount upstream of a second SCR catalyst when the present deNO$_x$ capability of the first SCR catalyst is not capable of meeting a deNO$_x$ requirement. The second SCR catalyst is located upstream of both the first SCR catalyst and a DOC/DPF system. The reductant doser command is provided in response to the deviation deNO$_x$ capability from the deNO$_x$ requirement.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining an NO$_2$ to NO$_x$ ratio reference target to a first selective catalytic reduction (SCR) catalyst of an aftertreatment system, the aftertreatment system including the first SCR catalyst, a second SCR catalyst upstream of the first SCR catalyst, and a diesel oxidation catalyst (DOC) upstream of the first SCR catalyst and downstream of the second SCR catalyst;
   determining a present NO$_2$ to NO$_x$ ratio to the first SCR catalyst, wherein determining the present NO$_2$ to NO$_x$ ratio to the first SCR catalyst includes receiving an input that indicates a deactivation condition of the DOC correlated to a reduced NO$_2$ production capability of the DOC, wherein the input indicating the deactivation condition corresponds to cumulative operational data for the aftertreatment system indicating one of a poisoning condition and an aging condition of the DOC;
   determining an NO$_2$ to NO$_x$ ratio deviation in response to the NO$_2$ to NO$_x$ ratio reference target and the present NO$_2$ to NO$_x$ ratio, wherein determining the NO$_2$ to NO$_x$ ratio deviation includes determining a threshold deviation value indicated by a calibration table based on the deactivation condition;
   determining a reductant doser command for injection of a reductant amount upstream of the second SCR catalyst in response to the threshold deviation value; and
   providing the reductant doser command in response to the threshold deviation value.

2. The method of claim 1, further comprising determining a rate of change of the present NO$_2$ to NO$_x$ ratio and further adjusting the reductant doser command in response to the rate of change.

3. The method of claim 1, wherein the second SCR catalyst is a close-coupled SCR catalyst.

4. The method of claim 1, wherein determining the present NO$_2$ to NO$_x$ ratio further comprises determining an NO/NO$_2$ amount at an outlet of the DOC.

5. The method of claim 1, wherein determining the present NO$_2$ to NO$_x$ ratio further comprises determining an NO$_2$ amount at an inlet to the first SCR catalyst and at an outlet of the first SCR catalyst.

6. The method of claim 1, wherein the aftertreatment system includes the first and second SCR catalysts and the DOC comprises a portion of a diesel oxidation catalyst/diesel particulate filter (DOC/DPF) system.

7. The method of claim 6, wherein determining the deactivation condition includes determining cumulative regeneration hours of the DOC/DPF system.

8. The method of claim 6, wherein determining the deactivation condition includes determining accumulated temperature time of the aftertreatment system.

9. The method of claim 6, wherein determining the deactivation condition includes determining a reversible deactivation condition by determining fuel consumption at temperature.

10. The method of claim 9, wherein the reversible deactivation condition is a sulfur loading of the DOC/DPF system.

11. The method of claim 6, wherein the reductant amount for injection upstream of the second SCR catalyst increases as the DOC/DPF system ages.

12. The method of claim 1, wherein determining the reductant injection command further includes determining a second reductant command for injection of a second reductant amount upstream of the first SCR catalyst and downstream of the DOC.

13. The method of claim 12, wherein the second reductant amount decreases as the reductant amount injected upstream of the second SCR catalyst increases.

14. The method of claim 13, wherein the second reductant amount is limited to control ammonia slip past the second SCR catalyst.

15. A method, comprising:
   interpreting an NO$_2$ to NO$_x$ ratio reference target comprising a target amount of NO$_2$ to a first selective catalytic reduction (SCR) catalyst of an aftertreatment system, the aftertreatment system including the first SCR catalyst, a second SCR catalyst upstream of the first SCR catalyst, and a diesel oxidation catalyst DOC upstream of the first SCR catalyst and downstream of the second SCR catalyst;
   interpreting a present NO$_2$ to NO$_x$ ratio upstream of the first SCR catalyst, wherein interpreting the present NO$_2$ to NO$_x$ ratio upstream of the first SCR catalyst includes interpreting an input that indicates a deactivation condition of the DOC correlated to a reduced NO$_2$ production capability of the DOC, wherein the input indicating the deactivation condition corresponds to cumulative operational data for the aftertreatment system indicating one of a poisoning condition and an aging condition of the DOC;
   interpreting a deviation of the present NO$_2$ to NO$_x$ ratio from the NO$_2$ to NO$_x$ ratio reference target, wherein determining the deviation of the present NO$_2$ to NO$_x$ ratio from the NO$_2$ to NO$_x$ ratio reference target includes determining a threshold deviation value indicated by a calibration table based on the deactivation condition; and
   injecting an amount of reductant upstream of the second SCR catalyst to provide the target amount of NO$_2$ to the first SCR catalyst in response to the threshold deviation value.

16. The method of claim 15, wherein the DOC comprises a portion of a diesel oxidation catalyst/diesel particulate filter (DOC/DPF) system between the first and second SCR catalysts.

17. The method of claim 16, further comprising injecting a second amount of reductant upstream of the first SCR catalyst and downstream from the DOC/DPF system.

18. The method of claim 17, wherein the second amount of reductant decreases as the amount of reductant injected upstream of the second SCR catalyst increases.

19. The method of claim 18, wherein the second amount of reductant is limited to control ammonia slip past the second SCR catalyst.

20. The method of claim 16, wherein interpreting the present $NO_2$ to $NO_x$ ratio further comprises interpreting an $NO/NO_2$ amount at an outlet of the DOC/DPF system.

21. The method of claim 16, wherein interpreting the deactivation condition includes interpreting cumulative regeneration hours of the DOC/DPP system.

22. The method of claim 16, wherein interpreting the deactivation condition includes interpreting a reversible deactivation condition by determining fuel consumption at temperature.

23. The method of claim 22, wherein the reversible deactivation condition is a sulfur loading of the DOC/DPF system.

24. The method of claim 15, wherein interpreting the present $NO_2$ to $NO_x$ ratio further comprises interpreting an $NO_2$ amount at an inlet and at an outlet of the first SCR catalyst.

25. The method of claim 15, wherein the $NO_2$ to $NO_x$ ratio reference target is a molar ratio of $NO_2$ to $NO_x$.

26. The method of claim 25, wherein the molar ratio is 0.5.

27. An apparatus, comprising:
a controller implemented hardware and a non-transitory computer readable medium, the plurality of modules including:
an $NO_2$ to $NO_x$ ratio reference target module structured to determine a $NO_2$ to $NO_x$ ratio reference target at an inlet to a first selective catalytic reduction (SCR) catalyst of an aftertreatment system, the first SCR catalyst being located downstream of a second SCR catalyst and a diesel oxidation catalyst (DOC) being located upstream of the first SCR catalyst and downstream of the second SCR catalyst;
an $NO_2$ to $NO_x$ ratio determination module structured to determine a present $NO_2$ to $NO_x$ ratio at the inlet to the first SCR catalyst in response to an input corresponding to cumulative operational data of the aftertreatment system indicating a deactivation condition of the DOC correlated to a reduced $NO_2$ production capability of the DOC due to one of an aging condition and a poisoning condition of the DOC;
an $NO_2$ to $NO_x$ ratio deviation module structured to determine an $NO_2$ threshold deviation value indicated by a calibration table based on the deactivation condition and the $NO_2$ to $NO_x$ ratio reference target; and
a dosing control module structured to provide a reductant doser command linked to the deactivation condition in response to the $NO_2$ threshold deviation value, the reductant doser command corresponding to a reductant amount for injection upstream of the second SCR catalyst.

28. The apparatus of claim 27, wherein the DOC comprises a portion of a diesel oxidation catalyst/diesel particulate filter (DOC/DPF) system between the first SCR catalyst and the second SCR catalyst.

29. The apparatus of claim 28, wherein the dosing control module is further structured to provide a second reductant doser command in response to the $NO_2$ threshold deviation value, the second reductant doser command corresponding to a second reductant amount for injection upstream of the first SCR catalyst and downstream of the DOC/DPF system.

30. The apparatus of claim 28, wherein the second SCR catalyst is a close-coupled SCR catalyst.

31. The apparatus of claim 28, wherein the $NO_2$ to $NO_x$ ratio determination module is further structured to determine the present $NO_2$ to $NO_x$ ratio as a function of an $NO/NO_2$ amount at an outlet of the DOC/DPF system.

32. The apparatus of claim 27, wherein the $NO_2$ to $NO_x$ ratio determination module is further structured to determine the present $NO_2$ to $NO_x$ ratio as a function of the $NO_2$ amount at the inlet and an outlet of the first SCR catalyst.

33. A system, comprising:
an internal combustion engine;
an exhaust conduit fluidly coupled to the internal combustion engine; a first selective catalytic reduction (SCR) catalyst fluidly coupled to the exhaust conduit;
a second SCR catalyst fluidly coupled to the exhaust conduit at a position upstream of the first SCR catalyst;
a diesel oxidation catalyst (DOC) located upstream of the first SCR catalyst and downstream of the second SCR catalyst;
a reductant doser operationally coupled to the exhaust conduit at a first position upstream of the first SCR catalyst and downstream of the second SCR catalyst and at a second position upstream of the second SCR catalyst;
a controller including a plurality of modules implemented in at least one of hardware and a non-transitory computer readable medium, the plurality of modules comprising:
an $NO_2$ to $NO_x$ ratio reference target module structured to determine a $NO_2$ to $NO_x$ ratio reference target at an inlet to the first SCR catalyst;
an $NO_2$ to $NO_x$ ratio determination module structured to determine a present $NO_2$ to $NO_x$ ratio at the inlet to the first SCR catalyst in response to an input corresponding to cumulative operational data of the aftertreatment system indicating a deactivation condition of the DOC correlated to a reduced $NO_2$ production capability of the DOC due to one of an aging condition and a poisoning condition of the DOC;
an $NO_2$ to $NO_x$ ratio deviation module structured to determine an $NO_2$ threshold deviation value indicated by a calibration table based on the deactivation condition and the $NO_2$ to $NO_x$ ratio reference target; and
a dosing control module structured to provide a reductant doser command linked to the deactivation condition in response to the $NO_2$ threshold deviation value, the reductant doser command corresponding to a first reductant amount for injection at the first position and a second reductant amount for injection at the second position.

34. The system of claim 33, wherein the second SCR catalyst is a close-coupled SCR catalyst.

* * * * *